(No Model.) 2 Sheets—Sheet 1.

J. C. TUTT.
CORN POPPER.

No. 496,021. Patented Apr. 25, 1893.

Witnesses:
M. P. Smith.
G. J. Thorpe.

Inventor:—
John C. Tutt.
By Hjaan & Hjaan Att'ys.

(No Model.) 2 Sheets—Sheet 2.
J. C. TUTT.
CORN POPPER.
No. 496,021. Patented Apr. 25, 1893.
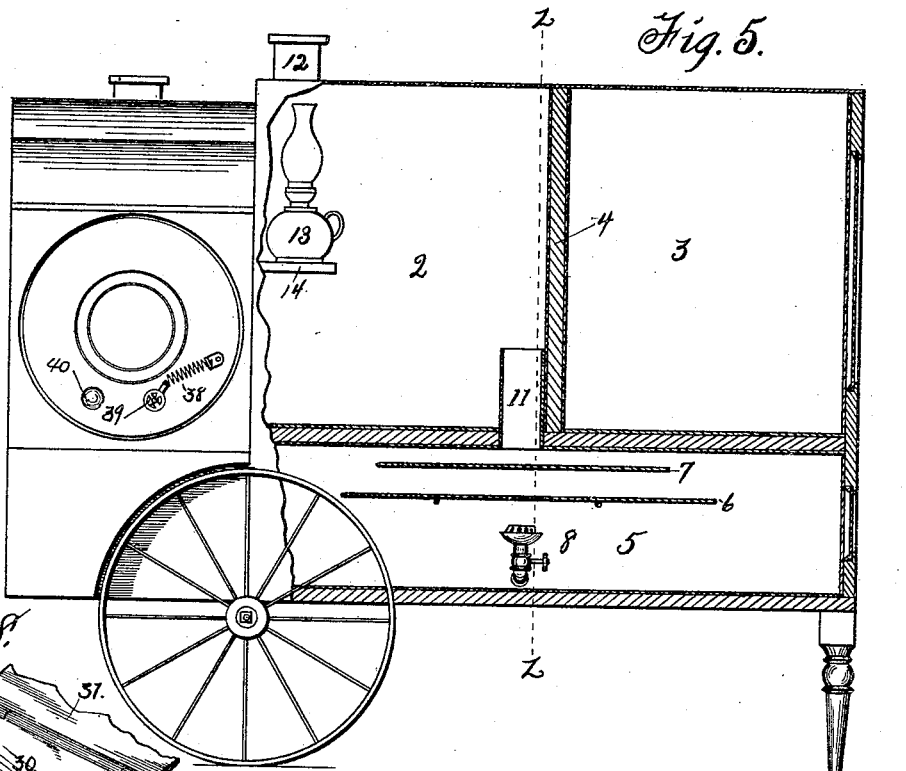
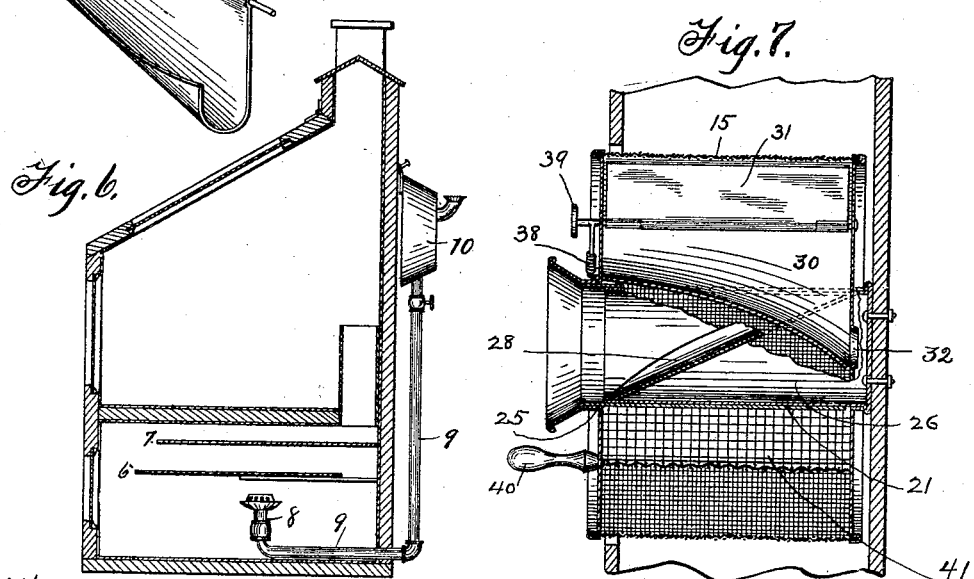
Witnesses:— W. P. Smith, G. L. Thorpe.
Inventor:— John C. Tutt.
By Higdon & Higdon Atty's.

UNITED STATES PATENT OFFICE.

JOHN C. TUTT, OF GUTHRIE, OKLAHOMA TERRITORY.

CORN-POPPER.

SPECIFICATION forming part of Letters Patent No. 496,021, dated April 25, 1893.

Application filed September 3, 1892. Serial No. 444,944. (No model.)

*To all whom it may concern:*

Be it known that I, JOHN C. TUTT, of Guthrie, Oklahoma county, Oklahoma Territory, have invented certain new and useful Improvements in Corn-Poppers, of which the following is a full, clear, and exact description, reference being had to the accompanying drawings, forming a part hereof.

My invention relates to certain improvements in rotary corn poppers, peanut roasters and heaters, which are supported upon a wheeled frame, and may be moved about from place to place as the itinerary exigencies of the business may require.

Some of my improvements are applicable, especially, to corn-poppers, and to novel means for supplying the cylinder with corn and for delivering the corn as it is popped from the cylinder to a suitable receptacle, for throwing out the unpopped corn from the interior of the cylinder and delivering it to an ash-drawer beneath same, and to certain combinations and arrangements of parts and details of construction hereinafter described and designated in the claims.

Figure 1:
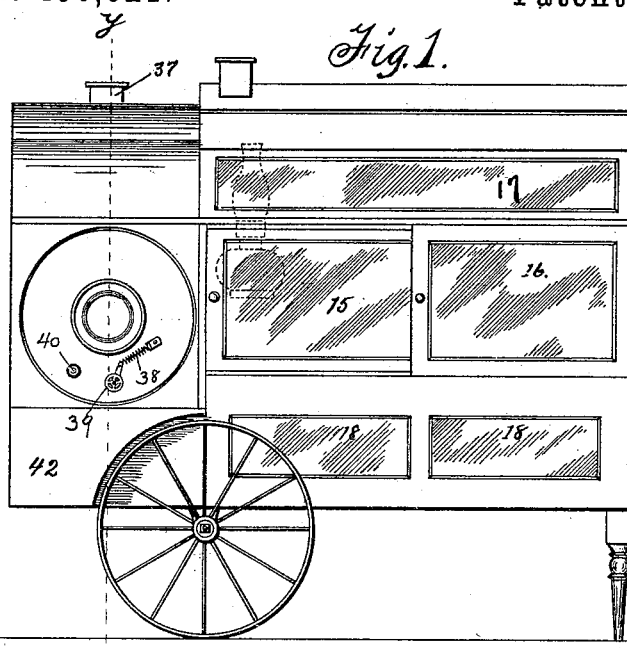
Figure 2:
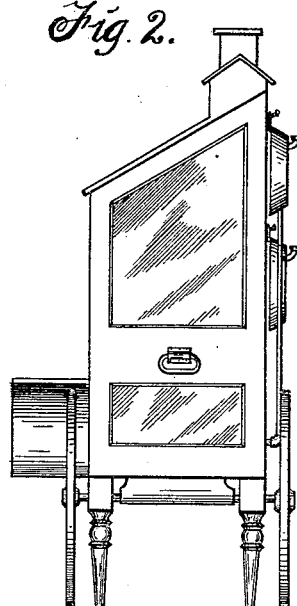
Figure 3:
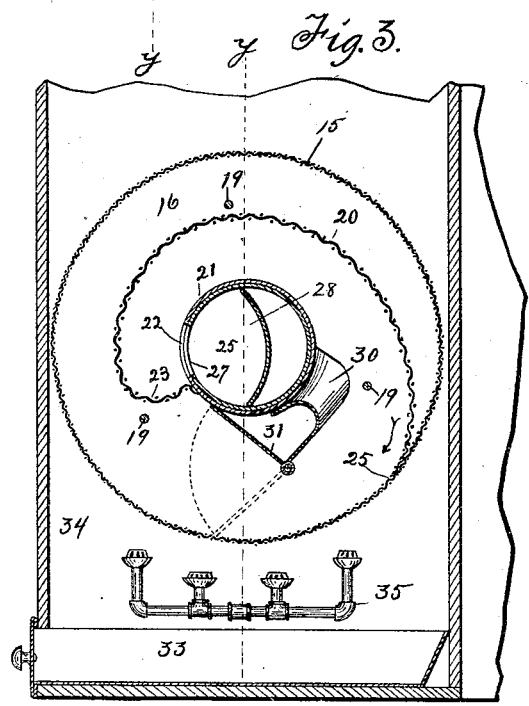
Figure 4:
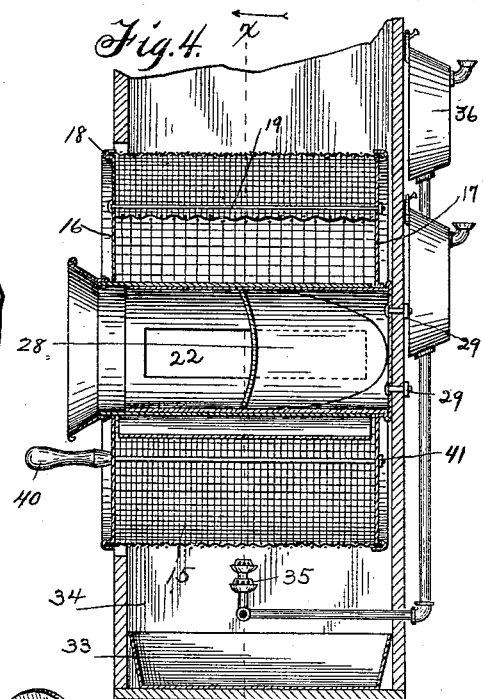
Figure 9:
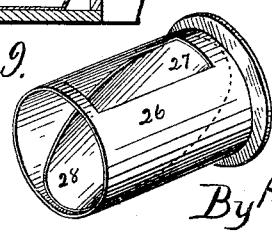

In the accompanying drawings:—Figure 1. is a side elevation of the machine embodying my invention. Fig. 2. is an end elevation of the same. Fig. 3. is an enlarged, sectional view in the line X X of Fig. 4. Fig. 4. is a similar enlarged, longitudinal section of the corn-popping cylinder in the line Y Y of Figs. 1 and 3. Fig. 5. is an enlarged, sectional elevation of the machine showing the several heating chambers and compartments in section. Fig. 6. is a transverse, vertical section in line Z Z of Fig. 5. Fig. 7. is a longitudinal section in the line Y Y of Fig. 3, showing the unpopped-corn-delivering chute, and the popped-corn-delivering chute, partly broken away. Figs. 8 and 9 are detail perspective views respectively, of the deflector cylinder for delivering the unpopped corn from the machine, and the guide scroll plate, and its deflecting valve, for discharging the unpopped corn from the machine.

The main frame, body, or casing, 1, of the machine is formed, preferably, of wood with an inner lining of metal, and consists of four compartments, namely, heater compartments 2 and 3, into which the corn and peanuts are deposited after having been roasted, separated by a partition, 4, the heating chamber, 5, located beneath the compartments 2 and 3, having deflecting plates 6 and 7 located one above the other, and the burner, 8, located beneath said deflecting plates and supplied through a pipe, 9, from a can, 10, supported upon the back of the machine. A chimney, 11, located above the upper plate, 7, conveys the products of combustion through the chamber, 2, to the chimney, or point of exit, 12, and the lamp, 13, supported upon the block, 14, in the compartment, 2, serves to illuminate the interior of said compartment and its surroundings through the glass doors, 15 and 16, of compartments 2 and 3, and the panels 17 and 18, located, respectively, above and below said doors, which will be fully protected from the weather and give sufficient light to enable the vender to transact his business.

The corn-popping cylinder 15, consists of the oppositely disposed circular heads 16 and 17, each provided with inwardly extending annular flanges 18, and the cylindrical wire mesh, the side margins of which engage over said flanges, to form the cylinder; and which wire mesh is of sufficient fineness to retain within it the grains of unpopped corn. The cylinder heads 16 and 17, are braced and supported by the rods 19—19—19, which extend longitudinally through the cylinder and through the circular heads 16 and 17. The head 16 is also provided with a central opening 25 through which extends a plate metal cylinder 21, the rear end of which is adjacent to the inner side of the head 17. This cylinder 21 is provided with a longitudinally extending slot 22. A partition 20 of wire mesh is secured at its inner end to the cylinder 21, and passing spirally over the opening 22 is secured at its outer end to the inner surface of the wire mesh of the cylinder 15, the side margins thereof being secured to the inner sides of the heads of the cylinder 15. A cylinder 26 fits closely within the cylinder 21, and extending beyond the rear end thereof, projects through an opening 25 in the head 17, similar to the opening 25 of the head 16. The rear or closed end of the cylinder 26, is bolted securely at 29—29, to the rear wall of the casing or frame, while the cylinders 15 and 21 are adapted to revolve thereon. The cylinder 26, is provided with a longitudinally extending slot 27, and an obliquely arranged deflector plate 28, segmental in cross-section preferably, which is of marginal contour to fit within the cylinder 28, the inner or rear end being secured to the inner surface of the cylinder, in rear of the rear end of the slot 27, and the outer end being secured to the front end of the inner surface of the cylinder opposite to the slot 27; thus forming an inclined deflector or guide plate within the cylinder 26. The cylinders 15 and 21 are adapted to be rotated around the cylinder 26, and the slot of the cylinder 21 registers with the slot of cylinder 26, once during every revolution, and the popped corn contained within the cylinder 15, is deposited continuously on the plate 28, and is deflected toward the front end of the machine.

A guide plate, 30, is secured between the heads 16 and 17 of the cylinder 15 to rest at its inner end against the cylinder 21, and is extended in the form of a scroll to the middle portion of the space between the cylinder 21 and the cylinder 15, and its outer end is hinged to the valve 31, which is adapted to rest at its free end upon the cylinder 21 as shown in Fig. 3 by full lines, or rest upon cylinder 15 as shown by dotted lines, to respectively open the space between the inner and outer cylinders 21 and 15 respectively, as shown by full lines, or close the same, as shown by dotted lines, in which last mentioned position the contents of the cylinder as the cylinders 15 and 21 are rotated, are deflected by the valve, into the scroll guide plate 30, from whence the contents of the cylinder 15 which remain after the corn is popped, and consist principally of refuse and worthless material, are delivered to the spout 32 through the rear end of the cylinder and dropped into the ash-pan, 33, at the bottom of the compartment 34 which contains and incloses the corn-popping cylinder and one or more burners, 35, located beneath the cylinder, and supplied with oil from a reservoir, 36, supported upon the casing, and supplies the requisite heat for popping the corn. The products of combustion pass out through and from the chimney, 37. The valve, 31, is normally held in position as shown in Fig. 3 by a spiral spring, 38, and is turned, or operated by hand wheel 39 upon the end of its pivotal rod to throw it into the position shown by the dotted lines in the above mentioned figure.

The corn-popping cylinder, 15, may be revolved by means of a handle, 40, upon the end of a rod, 41, extending longitudinally through the cylinder.

The operation of the machine will be readily understood from the foregoing description of its construction. As the cylinders revolve in the direction of the arrow shown in Fig. 3 the corn is carried around, and scooped up by the spiral partition 20 as fast as it is popped, the unpopped corn passing through the large interstices of the partition and is retained in the outer cylinder 15. The popped corn is all carried toward the interior thereof by the spiral partition 20, which at each revolution deposits its contents through the openings 22 and 27 to the interior of cylinder 26 from whence they are conveyed by the deflector 28 to the front end of the machine and deposited in a suitable trough, not shown, whence they may be transferred to one of the compartments 15 or 16. The unpopped corn, remaining in the cylinder 15, is discharged therefrom by operating the valve 31 to the position shown in dotted lines, Fig. 3, and then reversing the direction of the rotation of the cylinders, which causes the unpopped corn to be guided over the scroll plate 30, and discharged through the opening 32 in the rear wall of the cylinder 15, from whence it drops into the pan 33 below.

Having described my invention, what I claim as new, and desire to secure by Letters Patent, is—

1. A corn popper, comprising a casing, an enlarged opening in the front side thereof, a stationary cylinder, having a closed rear end, and secured thereat, to the inner rear wall of the casing, a longitudinally extending slot in said stationary cylinder, and an inclined deflector plate secured within said cylinder, and opposite to the slot or opening therein, substantially as described.

2. A corn popper, comprising a casing, an enlarged opening in the front side thereof, a stationary cylinder secured at its closed end to the inner rear wall of the casing, a longitudinally extending slot in said cylinder, and an inclined deflector plate, arranged within the cylinder, and opposite to the slot or opening therein, in combination with a revoluble cylinder fitting closely around the stationary cylinder and provided with a longitudinally extending slot or opening adapted to register with the opening or slot in the stationary cylinder, and a large corn popping cylinder, surrounding the revoluble cylinder, and a spiral partition of coarse wire mesh, connecting the revoluble cylinder and the inner side of the corn-popping cylinder, substantially as described.

3. A corn popper, comprising an outer revoluble screen cylinder, and an inner revoluble cylinder, a spiral screen partition of larger mesh than that of the screen cylinder, a scroll plate located between the outer end of said screen partition and the revoluble inner cylinder, an opening in the rear head of the screen cylinder, communicating with the space between the said scroll-plate and the said revoluble inner cylinder, and a valve plate, hinged to one end of the scroll plate, and adapted to close the entrance to the scroll plate, or to deflect the unpopped corn therein, substantially as described.

In testimony whereof I affix my signature in the presence of two witnesses.

JOHN C. TUTT.

Witnesses:
JAMES W. FAIRMAN,
J. O. GLENN.